T. W. NEWBURN.
BRAKE MECHANISM.
APPLICATION FILED JUNE 6, 1913.
1,095,286.
Patented May 5, 1914.
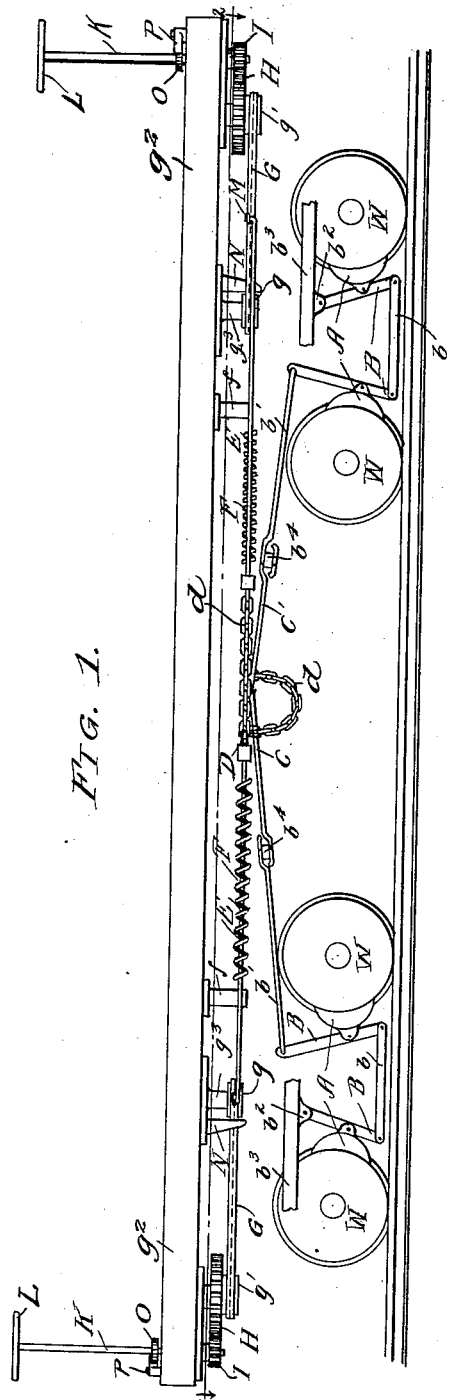
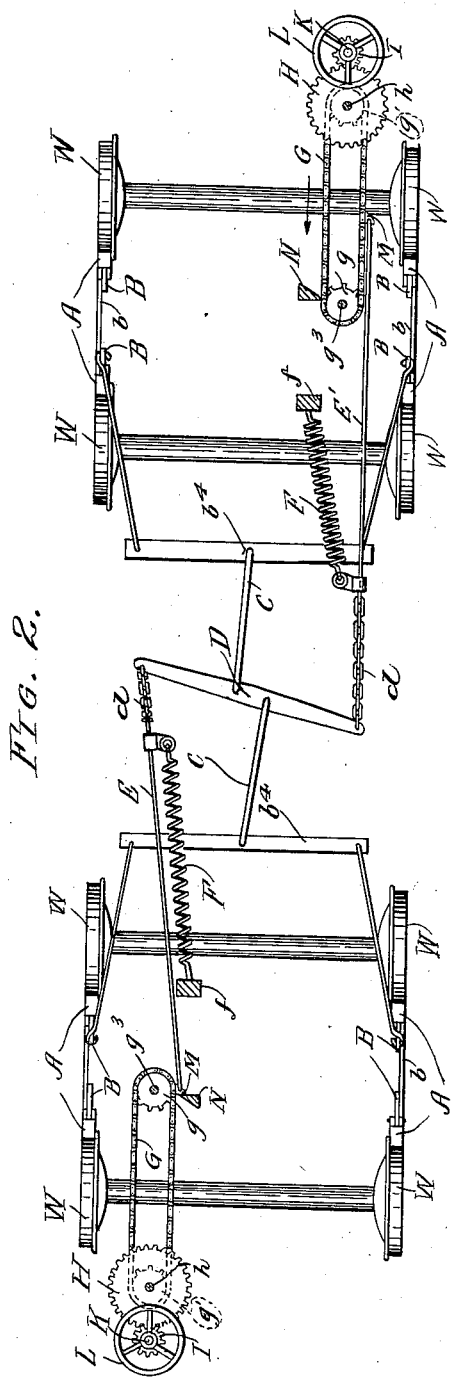
WITNESSES:
R. L. Bruck.
H. B. McGill.
INVENTOR.
Theodore W. Newburn,
By Hull & Smith
ATTY'S.

UNITED STATES PATENT OFFICE.

THEODORE W. NEWBURN, OF CLEVELAND, OHIO.

BRAKE MECHANISM.

1,095,286.  Specification of Letters Patent.  Patented May 5, 1914.

Application filed June 6, 1913. Serial No. 772,084.

*To all whom it may concern:*

Be it known that I, THEODORE W. NEWBURN, a citizen of the United States, residing at Cleveland, in the county of Cuyahoga and State of Ohio, have invented a certain new and useful Improvement in Brake Mechanism, of which the following is a full, clear, and exact description, reference being had to the accompanying drawings.

This invention relates to car brakes, and especially to brakes of the type known to the trade as "hand brakes." As heretofore constructed, these brakes have usually been provided with a vertical staff having at the upper end a brake lever or a brake wheel so located as to be conveniently operated, the bottom of the staff projecting through the car floor and being attached to one end of a chain, the other end whereof is connected to a brake rod, which rod in turn is connected to the brake shoe levers. By turning the brake wheel in the appropriate direction, the chain is wound up, causing the brake rod to be drawn toward the staff, thus forcing the brake shoes against the car wheels, by means of the levers and connections ordinarily provided between such rod and shoes.

It is the object of this invention to provide a hand brake of the foregoing type with simple and effective means whereby, when the brake staff is rotated a short distance by hand, the chain is quickly, effectively, and automatically wound up to brake-applying position and the brakes applied to the wheels, saving the operator the labor and time which would otherwise be consumed in taking up this lost motion in operating the brake staff by hand; also to provide means whereby the brakes may be securely held in released position without the necessity for employing a positive lock or catch; that will enable the operator to apply and release the brake shoes merely by manipulating the ordinary brake wheel or lever with the use of an ordinary pawl and ratchet for holding the brakes in applied position.

With the foregoing general objects in view, the invention may be defined still more generally as consisting of the combinations of elements embodied in the claims hereto annexed and illustrated in the drawings forming part hereof, wherein—

Figure 1 represents a side elevation of a car having applied thereto brake mechanism constructed in accordance with my invention; and Fig. 2 a somewhat diagrammatic plan view of said mechanism, the view corresponding to the line 2—2 of Fig. 1.

Describing by reference characters the various parts illustrated herein, A denotes the brake shoes, said brake shoes being carried by levers B connected at their lower ends by a link $b$. One of the levers B is free to move at its upper end and is connected to a rod $b'$. The other lever is pivotally supported at its upper end, as from a bracket $b^2$, which is carried by a part of the car truck, a fragment of such part being indicated at $b^3$. The rods $b'$ are connected to the usual equalizing bar $b^4$, whereby the brake shoes on opposite sides of the car may be applied and released by the same operation. The brake rod C is connected at one end to the equalizing bar $b^4$ and at the opposite end to a cross bar D, as is usual in the brake rigging construction. It will be noted that the brake rod C is connected to the cross bar D at one side of the center. From a corresponding point on the opposite side of the center of this cross bar there extends a brake rod C' which is connected to the same parts at the opposite end of the car as the rods C. The opposite ends of the cross bar D are connected by chains $d$ to rods E and E', said rods extending toward the opposite ends of the car and being connected to the hand brake mechanism in the same manner. The description of one of the hand brake mechanisms and the connections between the same and one of the rods E, E' will therefore suffice for both. In the embodiment of my invention as illustrated herein and in the construction thus far described, I have purposely selected a very simple form of brake rigging, in order to avoid any confusion as to the mode of application of my invention thereto. It will be understood to those skilled in the art that my invention may be applied equally well to brake rigging adapted to be operated by compressed air; but illustration of such air brake rigging is omitted for the reasons stated.

It will be observed that the rod E is connected to one end of the lever D by one of the chains $d$, and a coil spring F is connected at one of its ends to said rod and at its opposite end to a fixed portion of the car body, indicated at $f$. The end of the rod opposite that which is connected to the lever D is connected to a chain G which extends around a pair of wheels $g$ and $g'$, located preferably beneath the car platform $g^2$. The wheel $g$ may be provided with teeth or projections, as shown, although this is unnecessary, this wheel serving to keep the chain from becoming too slack. The wheel $g'$, being a driving gear for the chain, will be provided with teeth or projections whereby the chain may be driven. The gear or sprocket wheel $g'$ is mounted upon and rigid with the stub shaft $h$ having a gear wheel H thereon which meshes with a pinion I on the brake staff K, the brake staff extending through the platform $g^2$ and being shown as provided with a hand wheel L. This brake staff will be provided with the usual ratchet O, there being a coöperating pawl P for said ratchet. To limit the throw of the chain by the spring F, the end of the rod E is provided with a stop M which is adapted to engage a projection N which may be conveniently carried by and beneath the car body or platform.

With the parts constructed as illustrated and described, the operation will be as follows:—Assuming that it is desired to apply the brakes, the operator turns the hand wheel L, thereby driving the chain G through the pinion I, gear H, and driving gear or sprocket wheel $g'$, the purpose of the pinion I and gear wheel H being to secure the necessary multiplication of power for setting the brakes. The chain being driven in the direction of the arrow on Fig. 2, as soon as the stop-provided end of the rod E passes the center of the stub shaft $g^3$ on which the wheel $g$ is mounted, the spring F will operate the rod E and, through it, the rods C and C', quickly taking in the slack of the chain G until the brake shoes A are in contact with the wheels W. The force of this spring is not sufficient to set the brakes and, after the brakes are in contact with the wheels, the hand wheel L is operated to so set the brakes. When it is desired to release the brakes, the operator turns the hand wheel L in the opposite direction, winding the chain G against the action of the spring F until the end of the rod E passes the center of the stub shaft $g^3$, when the spring operates to move the rod until the stop M engages the projection N. It will be understood that the rod E' extends to the opposite platform of the car and that it is operated in the same manner as the rod E, enabling the brakes to be applied and released from such platform.

By the construction provided herein, it will be apparent that I have produced a mechanism whereby the brakes may be positively and effectively released; that will retain the brakes securely in their released position and prevent the shoes from dragging against the wheels and without the employment of a positive lock or catch; that enables the operator to apply and release the brakes merely by the manipulation of the usual brake wheel or brake lever, with the use of an ordinary pawl and ratchet for holding the brakes in their applied position; and one that, when moved a short predetermined distance by the operator, will quickly and automatically take up the slack and the other lost motion in the brake rigging.

It will be evident that other means than the tension spring F may be employed to throw the rod E in a direction to apply the brakes and to automatically operate the chain E and the connected parts to brake applying position. The form shown herein, however, is one which is not only simple of construction but particularly practical in operation.

While I have necessarily described my invention in detail, it will be understood that these details may be departed from more or less without avoiding the spirit of my invention; and I do not propose to be limited by such specific description and illustration to the exact details of construction, except as such details may be positively included in the claims hereto annexed or such limitation may be rendered necessary by the state of the prior art.

Having thus described my invention, what I claim is:—

1. In mechanism of the character set forth, the combination of a brake rod, a chain connected thereto, gears or wheels around which said chain extends, a brake staff, a driving connection between said staff and one of said wheels or gears, a stop at one side of the other gear or wheel and adapted to limit the movement of the brake rod, and a spring tending to move said rod toward said gears or wheels.

2. In mechanism of the character set forth, the combination of a brake rod, a chain connected thereto, gears or wheels around which said chain extends, a brake staff, a driving connection between said staff and one of said wheels or gears, a stop at one side of the gears or wheels and adapted to limit the movement of the brake rod toward brake-applying position, and means tending to move said rod toward such position.

3. In mechanism of the character set forth, the combination of a brake rod, means tending to move the same to brake-applying position, a stop arranged to limit the movement of the rod in such direction, and brake-setting means connected with said rod and adapted to move the same away from said stop to permit further movement of the rod in such direction by the first mentioned means.

4. In mechanism of the character set forth the combination of a brake-rod, means tending to move the same to brake applying position, a stop limiting the movement of the rod in such direction, a brake staff, and brake-setting mechanism operated from said staff for applying the brakes and for moving the brake rod away from its stop to enable the first mentioned means to operate.

5. In mechanism of the character set forth, the combination of a brake rod, a spring connected thereto and tending to move the rod to brake-applying position, a stop for limiting the movement of said rod in such direction, and operating means adapted to move the rod away from the stop and permit the movement of the brake rod, by the spring, to brake-applying position.

6. In mechanism of the character set forth, the combination of a brake rod, an endless chain to which said rod is connected, a pair of wheels or gears around which said chain passes, means for rotating one of said wheels or gears to drive the chain, means tending to move the brake rod and the connected chain to brake-applying position, and a stop at one side of the center of one of the chain gears or wheels for limiting the movement of the brake rod in such direction on that side of said gear or wheel.

7. In mechanism of the character set forth, the combination of a brake rod, an endless chain to which said rod is connected, a pair of wheels or gears around which said chain passes, means for rotating one of said wheels or gears to drive the chain, means tending to move the brake rod and the connected chain to brake-applying position, and a stop on one side of one of the chain gears or wheels for limiting the movement of the brake rod in such direction.

In testimony whereof, I hereunto affix my signature in the presence of two witnesses.

THEODORE W. NEWBURN.

Witnesses:
 JOHN B. HULL,
 ALBERT H. BATES.

---

Copies of this patent may be obtained for five cents each, by addressing the "Commissioner of Patents, Washington, D. C."